May 7, 1929.   O. SAMMINIATELLI   1,712,092
DISPLAY DEVICE
Filed Dec. 2, 1927   5 Sheets-Sheet 1

Oreste Samminiatelli, INVENTOR
BY Victor J. Evans ATTORNEY

May 7, 1929.  O. SAMMINIATELLI  1,712,092
DISPLAY DEVICE
Filed Dec. 2, 1927   5 Sheets-Sheet 2
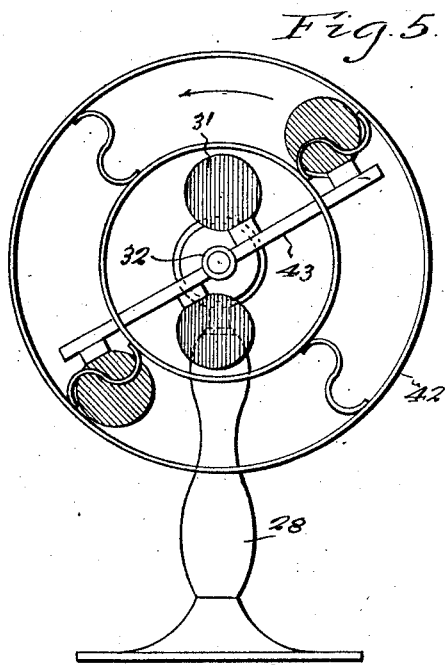
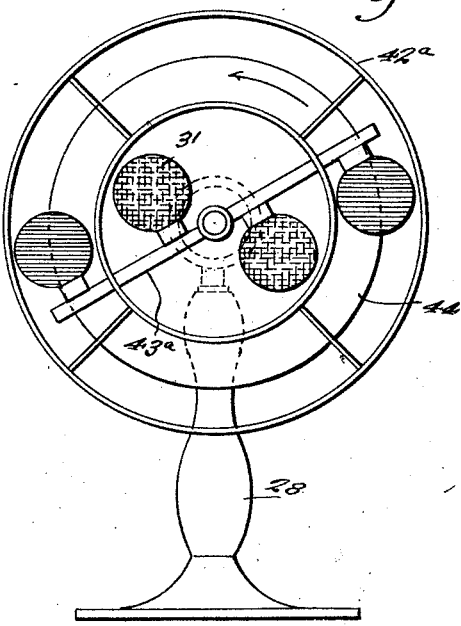
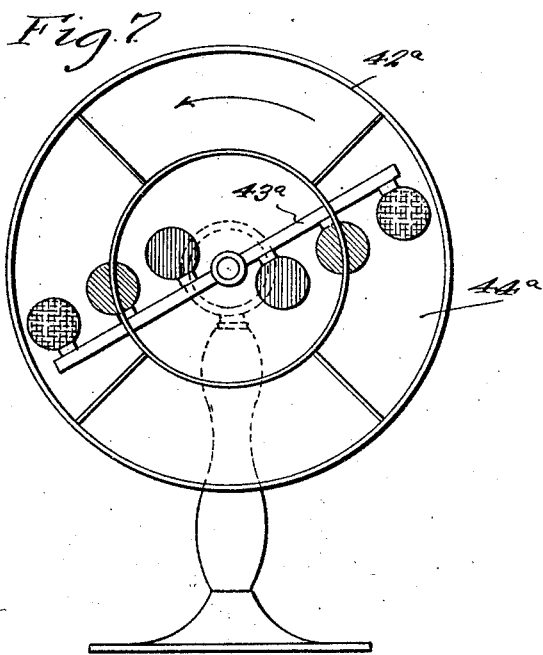
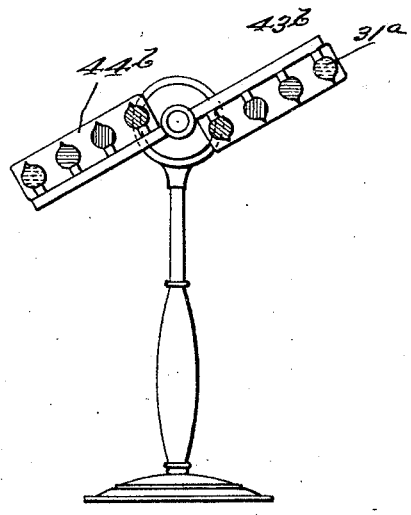
Oreste Samminiatelli INVENTOR May 7, 1929.　　O. SAMMINIATELLI　　1,712,092
DISPLAY DEVICE
Filed Dec. 2, 1927　　5 Sheets-Sheet 3

Oreste Samminiatelli
INVENTOR

BY *Victor J. Evans*
ATTORNEY

WITNESS:

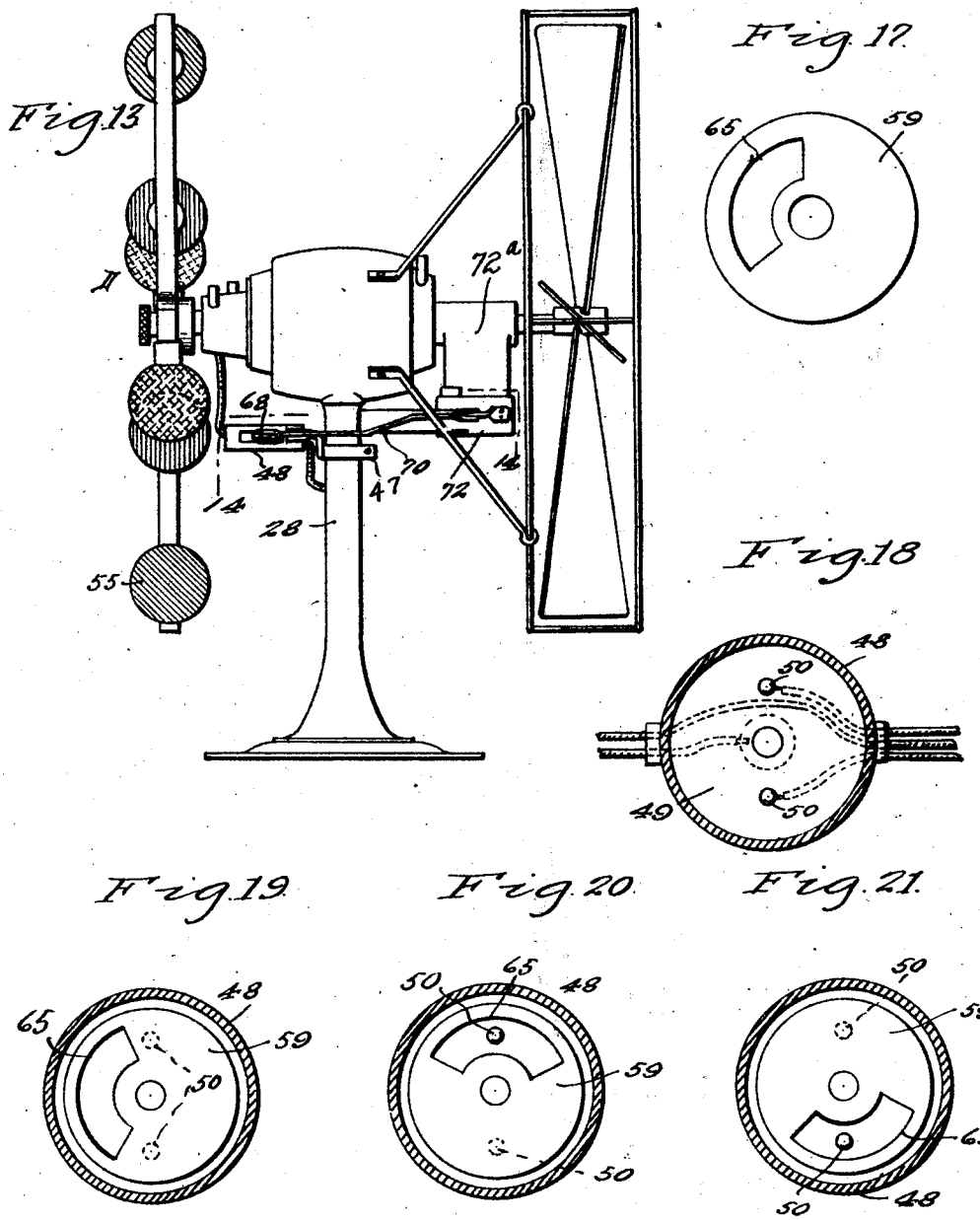

May 7, 1929.　　　O. SAMMINIATELLI　　　1,712,092
DISPLAY DEVICE
Filed Dec. 2, 1927　　　5 Sheets-Sheet 5
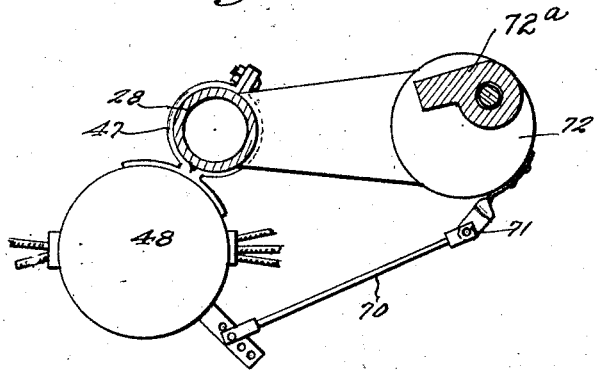
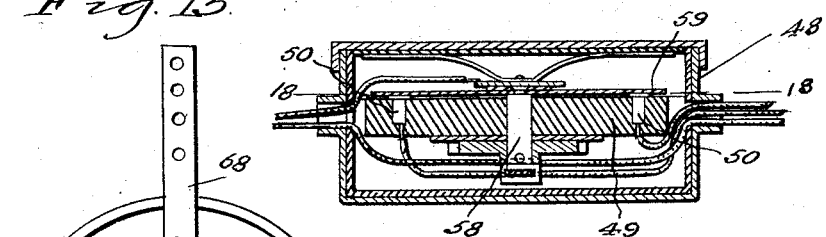
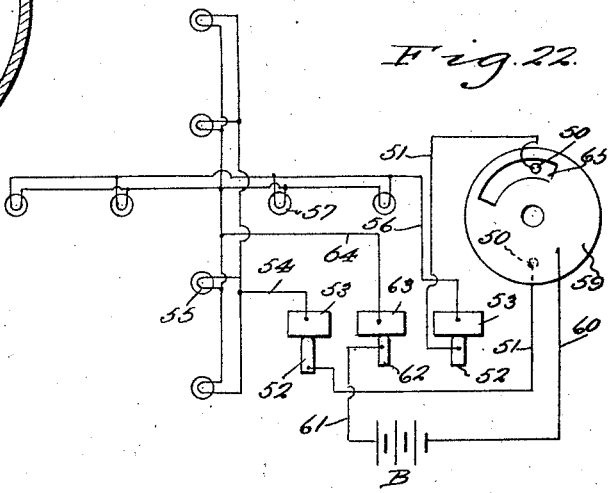
Oreste Samminiatelli INVENTOR
BY Victor J. Evans
ATTORNEY Patented May 7, 1929.

1,712,092

UNITED STATES PATENT OFFICE.

ORESTE SAMMINIATELLI, OF EAST TOLEDO, OHIO.

DISPLAY DEVICE.

Application filed December 2, 1927. Serial No. 237,278.

This invention relates to display devices and is an improvement upon the subject matter of copending applications Serial No. 152,950 and Serial No. 157,372, filed by me December 6, 1926, and December 27, 1926, respectively.

An object of the present invention is to provide an electric display device which may be detachably secured to the shaft and operated by the motor of an electric fan, so that the device may be used with a fan to provide an attractive window or other display at the same time the fan is used, or the fan may be used without the device in the ordinary manner.

Another object of the invention is the provision of an electric display device which is used in connection with an electric fan of the oscillating type, the oscillating movement of the fan being utilized to actuate a switch for controlling the flow of current to the device, so that various pleasing and attractive effects may be obtained.

With the above and other objects in view, the invention further includes the following novel features and details of construction, to be hereinafter more fully described, illustrated in the accompanying drawings and pointed out in the appended claims.

In the drawings:—

Figures 5, 6, 7 and 8 are elevations showing different forms of display devices.

Figure 13 is a view similar to Figure 1 showing the invention applied to an oscillating fan.

Figure 14 is a section taken substantially on the line 14—14 of Figure 13.

Figure 15 is an enlarged fragmentary section illustrating the ratchet mechanism for operating the controlling switch.

Figure 16 is a diametrical section through the switch.

Figure 17 is a detail plan view of the contact disk of the switch.

Figure 18 is a horizontal sectional view taken substantially on the line 18—18 of Figure 16, the view being on a reduced scale.

Figures 19, 20 and 21 are sectional views illustrating different positions of the switch.

Figure 22 is a diagram illustrating the wiring arrangement.

Figure 1:
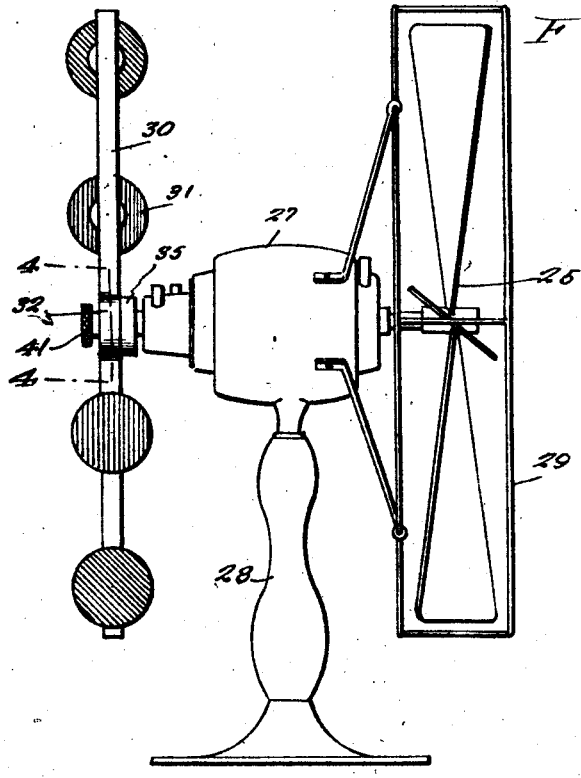
Figure 1 is an elevation illustrating the invention mounted upon an electric fan.
Figure 3:
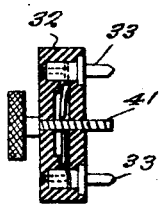
Figure 3 is a sectional view through the hub of the rotatable member, the section being taken substantially on the line 3—3 of Figure 4 and on a reduced scale.
Figure 2:
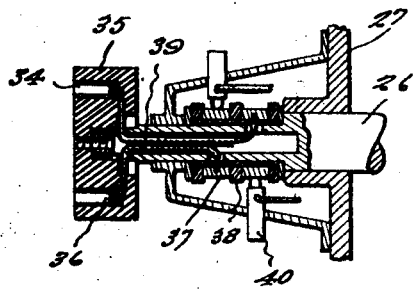
Figure 2 is an enlarged fragmentary section of the outer end of the armature or motor shaft and showing the means for supplying current to the electric device.
Figure 4:
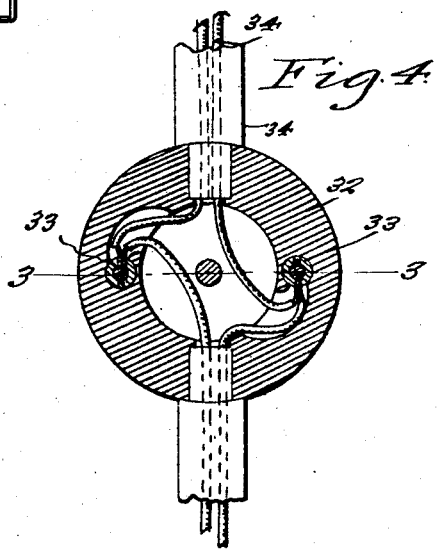
Figure 4 is an enlarged sectional view taken substantially on the line 4—4 of Figure 1.

Referring to the drawings in detail wherein like characters of reference denote corresponding parts, the reference character 25 indicates an electric fan which is mounted upon the shaft 26 of a motor 27, the latter being mounted upon a standard or support 28 of suitable construction. The fan is provided with the usual guard 29.

The invention comprises a display device which may be made in various shapes and designs, one form of the device comprising oppositely extending arms 30 which carry electric lamps 31. These lamps may be of any suitable size, shape or color and any number of arms may be provided for supporting the lamps with the latter arranged in any desired position upon the arms. The arms extend over an insulated hub 32 which carries contact pins 33, conductor wires 34 connecting these pins with the lamps 31. The pins 33 extend beyond the face of the hub 32 and are receivable within sockets 34 provided in an insulating block 35, the latter being mounted upon the outer end of the shaft 26. Located within the sockets 34 are contact members 36 which are electrically connected with collector rings 37 mounted upon the shaft 26 and separated from one another by insulators 38. Conductor wires 39 which extend into the shaft 26 serve to provide means of electrical connection between the contact members and the collector rings. Brushes 40 engage the rings 37 and these brushes are connected with a suitable source of current in the ordinary manner.

It will be seen that when the device is mounted upon the end of the motor shaft 26 and the fan is operated, current will be supplied to the lamps 31 and these lamps will be illuminated and will rotate to provide a pleasing and attractive display device.

In order to provide positive contact between the contact pins 33 and the contact members 36, and to prevent accidental disengagement of the display device from the shaft, there is provided a screw 41 which extends through the hub 32 and engages the insulating block 35. The device will thus be held in position against the action of centrifugal force, yet may be readily removed so that the fan may be used independently of the device.

As before stated, the display device may be of various forms. For example, it may be mounted upon the shaft 26 without the protection of a guard such as is shown at 42 in Figure 5 of the drawings. In this form of the invention, the device includes oppositely extending arms 43 which project from the hub 32 and which carry different colored lamps 31, the arms being designed to travel in the direction of the arrow shown in said figure. The lamps will thus move in advance of the arms.

In Figure 6 the device is substantially the same in that it includes oppositely extending arms 43$^a$ which carry lamps 31 with the device arranged in a guard 42$^a$. In addition, a reflector 44 is provided which acts to increase the attractiveness of the device. Its most important feature however resides in the fact that the reflector may be used to reflect heat from the lamps 31 which may be of sufficient power to provide a relatively great amount of heat.

In Figure 7 the reflector 44$^a$ is substantially the same diameter as the diameter of the guard 42$^a$. In this form of the invention, as in the form shown in Figure 6, the arms 43$^a$ travel in advance of the lamps in contradistinction to the form shown in Figure 5. Also, in the form illustrated in Figure 7 three lamps are carried by each arm instead of two.

In Figure 8, the arms 43$^b$ carry a number of small lamps 31$^a$, the lamps being differently colored and preferably of the type utilized for Christmas tree decoration. The arms 43$^b$ also serve to support reflectors 44$^b$, one reflector being carried by each arm.

Figure 9:
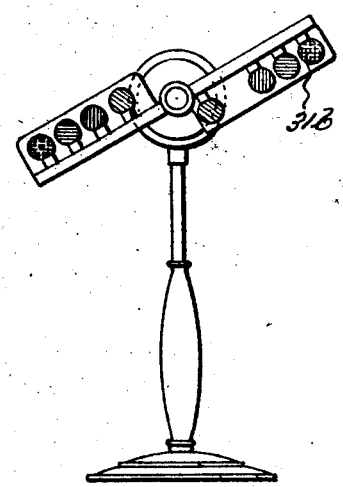
Figures 9, 10 and 11 are similar views showing other forms of display device.

In Figure 9, the device is similar to that shown in Figure 8, except that the lamps 31$^b$ are differently spaced, the innermost lamp of one arm being spaced a greater distance from the next adjacent lamp, than are the remaining lamps, and the innermost lamp of the other arm is so spaced, that when the device is rotated, it will provide a circular path of light within the space referred to.

Figure 10:
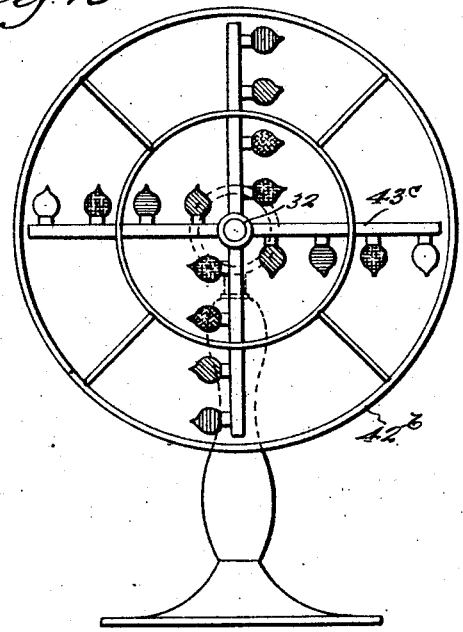

In the form of the invention shown in Figure 10, four arms 43$^c$ extend from the hub 32. These arms carry differently colored lights arranged in any suitable manner with the lights preferably of the type usually employed in Christmas tree decoration. The device is also preferably enclosed in a guard 42$^b$ and may be employed either with or without a reflector.

Figure 11:
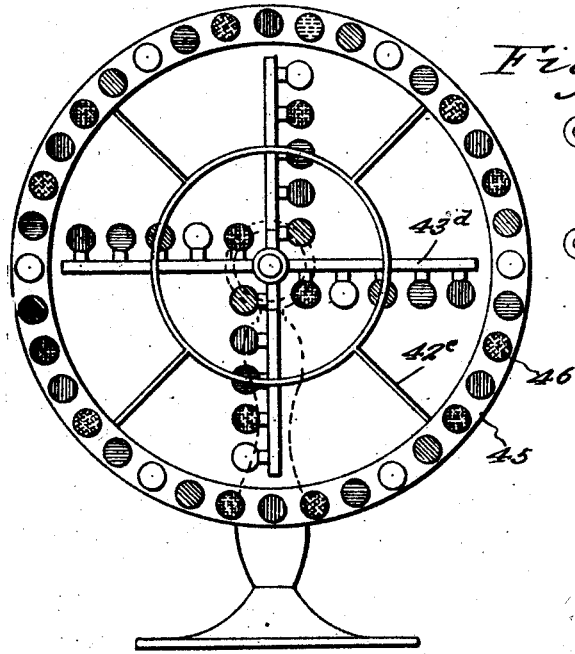

In Figure 11 the display device includes cross arms 43$^d$ which carry a desired number of lamps of suitable type. The device is mounted within a guard 42$^e$ and the latter serves to support an annular member 45 which carries a circular row of differently colored lights 46.

Figure 12:
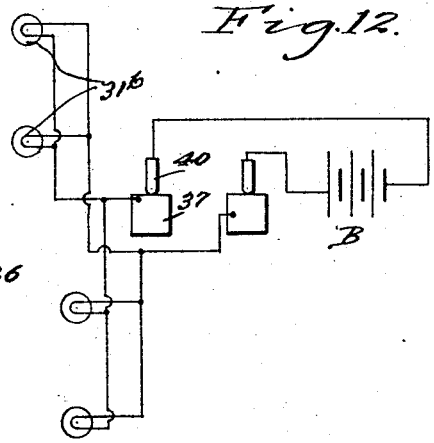
Figure 12 is a diagrammatic view illustrating the manner of wiring the display devices.

A wiring diagram of the device is shown in Figure 12 in which the lamps are connected by means of conductors with the collector rings 37, while the brushes 40 are connected with a suitable source of current indicated at B.

In Figure 13, the display device is mounted upon the shaft 26 of the motor after the manner previously described, the device which is indicated at D may be of any desired type. The fan shown in Figure 13 is of the oscillating type and its standard 28 is adapted to have secured thereto as shown at 47, a housing 48. This housing encloses a switch mechanism which comprises an insulating partition 49 suitably secured within the housing. This partition forms a support for stationary contacts 50 which are connected by conductors 51 to brushes 52 of the fan motor. These brushes engage collector rings 53 and one of these rings is connected by means of a conductor 54 with the lamps 55 of one arm of the display device. The other ring 53 is connected by a conductor 56 with the lamps 57 of the other arm of the display device. A shaft 58 extends through the partition 49 and carries a contact disk 59. This disk is connected by means of a conductor 60 with a source of current B and the latter is connected by means of a conductor 61 with a third brush 62 which engages a collector ring 63. The ring 63 is connected by a conductor 64 with the lamps 55. The disk 50 is provided with an insulated portion 65 which may be either in the form of a cut out portion, or an insulated strip upon the disk. Secured upon the shaft 58 is a ratchet wheel 66 whose teeth are engaged by a spring actuated holding dog 67. Mounted for free movement upon the shaft 58 is an arm 68 which carries a spring actuated dog 69. When oscillating movement is imparted to the arm 68, the dog 69 will move the ratchet wheel 66 in a step by step movement. Movement is imparted to the arm 68 through a rod 70 which is connected as shown at 71 to the housing 72 which contains the oscillating mechanism of the fan. This oscillating mechanism may be of any approved type and is operatively connected with a bracket 72$^a$ in which the fan shaft is mounted.

It will be apparent from the foregoing description and accompanying drawings, that as the fan is operated, the display device D will be rotated. In addition, the switch will be operated by the oscillating movement of the fan. This operation of the switch will rotate the disk 59 so that when the contact members 50 are in the position illustrated by the dotted lines in Figure 19 of the drawings, the lights upon one of the crossed arms will be illuminated. When the contacts are in the position shown in Figure 20 of the drawings, the lamps upon only one-half of one of the crossed arms will be illuminated, and when the contacts 50 are in the position shown in Figure 21 of the drawings, the lamps upon the other half of one of the crossed arms will be illuminated. It will thus be seen that full illumination of one of the crossed arms and half illumination of the other crossed arm will be alternately effected. By changing the number of contacts 50, a different arrangement of illumination may be provided.

It will be apparent from the foregoing description and accompanying drawings that the invention provides a display device which will provide an attractive advertising medium for business purposes and may be used upon the inside or outside of buildings. The invention will also provide an attractive and ornamental decoration for theaters as well as for private homes.

It will be apparent that the fan motor may be provided with a resistance switch to control the speed of the motor, so that when the fan is used a proper speed may be maintained, and when the display device is used, the speed may be reduced as desired.

It is also to be understood that the reducing gears used in connection with the form of the invention shown in Figure 13 of the drawings may be differently arranged.

The invention is susceptible of various changes in its form, proportions and minor details of construction and the right is herein reserved to make such changes as properly fall within the scope of the appended claims.

Having described the invention what is claimed is:

1. In combination with an electric fan, and means for oscillating the fan, an electric display device included in circuit with and operated by the fan motor and means controlled by the oscillating movement of the fan to control the flow of current to the display device.

2. In combination with an electric fan, and means for oscillating the fan, an electric display device included in circuit with and operated by the fan motor, a switch connected in circuit between the motor and display device to control the supply of current to the latter and means controlled by the oscillating movement of the fan to actuate the switch.

3. In combination with an electric fan, and means for oscillating the fan, an electric display device included in circuit with and operated by the fan motor, a rotary switch connected in circuit between the motor and display device to control the supply of current to the latter, a ratchet mechanism to operate the switch and means connecting the ratchet mechanism and fan to operate the ratchet mechanism through the oscillating movement of said fan.

In testimony whereof I affix my signature.

ORESTE SAMMINIATELLI.